(12) United States Patent
Sundaran Baby Sarojam (10) Patent No.: US 9,971,498 B2
(45) Date of Patent: May 15, 2018

(54) MEDICAL IMAGING DEVICE AND METHOD FOR USING ADAPTIVE UI OBJECTS

(71) Applicant: General Electric Company, Schenectady, NY (US)

(72) Inventor: Subin Sundaran Baby Sarojam, Doha (QA)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 14/969,207

(22) Filed: Dec. 15, 2015

(65) Prior Publication Data

US 2017/0168673 A1   Jun. 15, 2017

(51) Int. Cl.
G06F 15/00 (2006.01)
G06F 13/00 (2006.01)
G06F 3/0488 (2013.01)
G06F 3/041 (2006.01)
G06F 3/0484 (2013.01)

(52) U.S. Cl.
CPC .......... *G06F 3/0488* (2013.01); *G06F 3/0412* (2013.01); *G06F 3/04842* (2013.01); *G06F 3/04847* (2013.01)

(58) Field of Classification Search
CPC .................... G06F 3/016; A61N 1/37247
USPC ................. 715/761–765, 740, 748
See application file for complete search history.

(56) References Cited

U.S. PATENT DOCUMENTS

| 8,320,989 B2* | 11/2012 | Gardner | A61B 5/7207 382/128 |
| 9,026,217 B2* | 5/2015 | Kokones | A61N 1/37247 607/30 |
| 2014/0098049 A1* | 4/2014 | Koch | G06F 3/016 345/173 |

OTHER PUBLICATIONS

Brian Gill, Ultrasound Imaging with the SonoSite NanoMaxx: NanoMaxx Training Part 2 of 3, Dec. 18, 2014, 8 pages; http://www.providianmedical.com/blog/imaging-sonosite-nanomaxx-ultrasound-training-part-2.

* cited by examiner

*Primary Examiner* — Kevin Nguyen (57) ABSTRACT

A medical imaging device and method includes a touch-sensitive display, a medical image acquisition subsystem, and a processor. The processor is configured to display a first UI object and a second UI object on the touch-sensitive display, where the first UI object includes a first selection point and a first boundary. The processor is configured to adjust a position of the first UI object in response to a touch-based user input and to automatically adjust a position of the first selection point with respect to the first boundary in response to the touch based input when the first UI object is within a threshold distance from one of the second UI object and an edge of the touch-sensitive display.

20 Claims, 10 Drawing Sheets

MEDICAL IMAGING DEVICE AND METHOD FOR USING ADAPTIVE UI OBJECTS

BACKGROUND OF THE INVENTION

Touch-sensitive displays are commonly used to provide a touch-based user interface in various devices for many different applications. For instance, touch-based user interfaces are commonly used in medical imaging devices. One or more UI (user interface) objects, such as a measuring caliper, may be used to perform a measurement or other user operation on a medical image. It is typical to use two measurement calipers to measure lengths between various anatomical objects on the medical image. The user would typically use his fingers to manipulate the positions of the measurement calipers in order to select the points defining a distance or length in the medical image. It is also common to use three or more measurement calipers define a circle or ellipse in order to measure an area. Moreover, it is common for measurement calipers to be shaped like a teardrop in order to help the user more accurately select the desired measurement points on the touch-sensitive display. The existing techniques for selecting measurement points with a touch-based user interface all have notable limitations. For example, users may have a difficult time accurately selecting points close to the edge of the display with a teardrop-shaped measurement caliper. Depending upon the orientation of the teardrop-shaped measurement caliper, it may not be possible for the user to position the pointed end of the measurement caliper on the desired anatomy close to the edge of the image. Additionally, it may be very difficult for a user to accurately indicate small distances with existing UI objects for touch-sensitive displays. The user's fingers may commonly obscure some or all of the UI object, making accurate measurements difficult.

Users may experience similar problems with existing UI objects in other applications as well, such as creating freeform drawings on a touch-sensitive display and/or identifying contours in a medical image. For the reasons discussed hereinabove, there is a need for an improved medical imaging device and method for performing a user operation on a medical device with a touch-sensitive display.

BRIEF SUMMARY OF THE INVENTION

In an embodiment a medical imaging device includes a touch-sensitive display configured to receive touch-based user inputs, a medical image acquisition subsystem, and a processor in electronic communication with the touch-sensitive display and the medical image acquisition subsystem. The processor is configured to display a first UI object and a second UI object on the touch-sensitive display. The first UI object includes a first selection point and a first boundary. The second UI object includes a second selection point and a second boundary. The processor is configured to adjust a position of the first UI object in response to a touch-based user input. The processor is configured to automatically adjust a position of the first selection point and a second boundary. The processor is configured to automatically adjust a position of the first selection point with respect to the first boundary in response to a touch-based user input when the first UI object is within a threshold distance from one of the second UI object and an edge of the touch-sensitive display. The processor is configured to receive an instruction for a user operation based at least in part on the touch-based user input and to implement the user operation.

In an embodiment a method of performing a user operation on a medical imaging device including a touch-sensitive display and a processor includes displaying a first UI object including a first boundary and a first selection point on the touch-sensitive display. The method includes displaying a second UI objection including a second boundary and a second selection point on the touch-sensitive display. The method includes adjusting a position of the first UI object in response to a touch-based user input. The method includes automatically adjusting a position of the first selection point with respect to the first boundary in response to the touch-based user input when the first UI object is within a threshold distance from one of the second UI object and an edge of the touch-sensitive display. The method includes providing instructions to the processor for a user operation based at least in part on the touch-based user input and implementing the user operation with the processor.

A more complete understanding of the present invention, as well as further features and advantages thereof, will be obtained by reference to the following detailed description and drawings.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical and other changes may be made without departing from the scope of the embodiments. The following detailed description is, therefore, not to be taken as limiting the scope of the invention.

Figure 1:
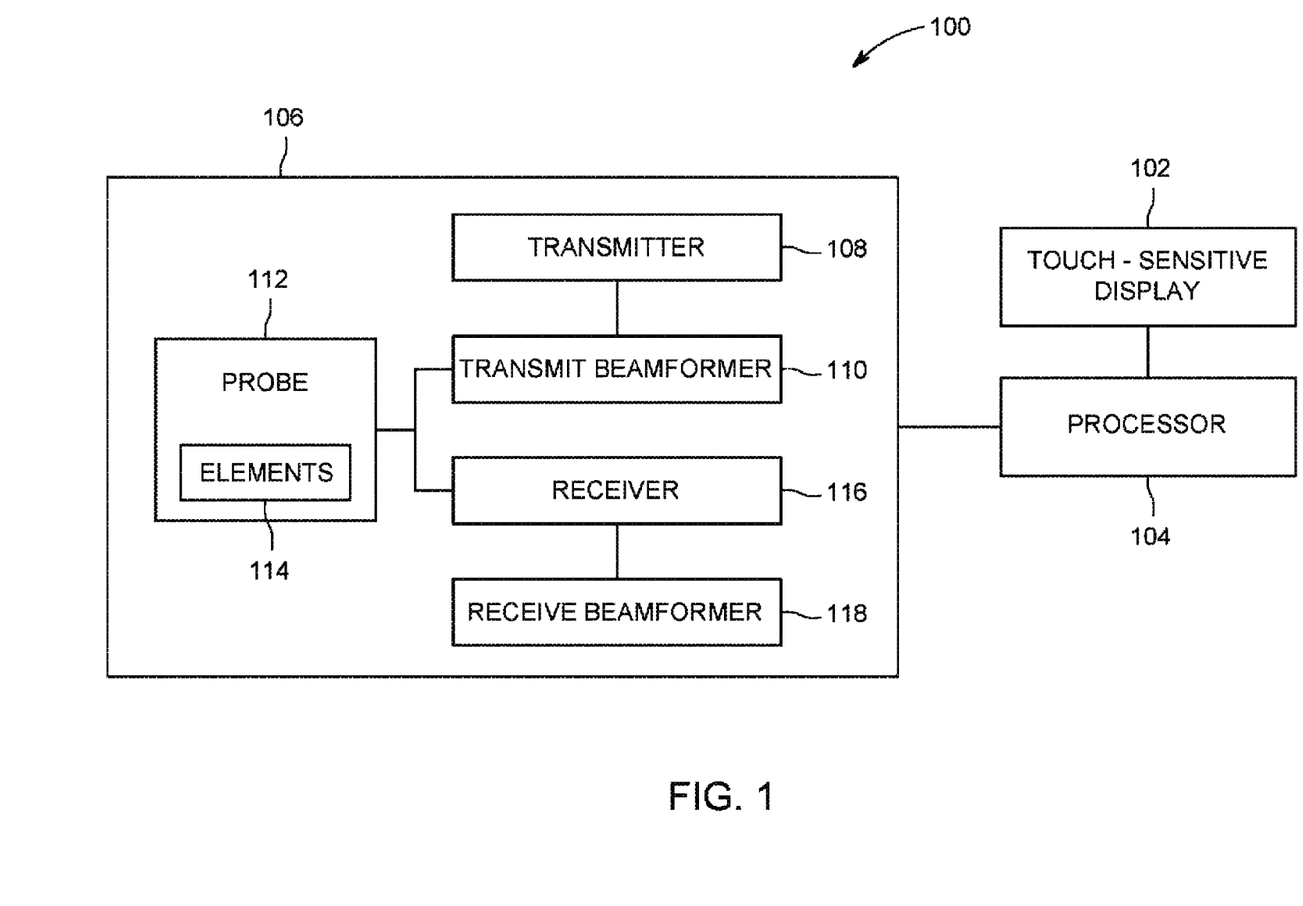
FIG. 1 is a schematic representation of a medical imaging device in accordance with an exemplary embodiment.

FIG. 1 is a schematic representation of a medical imaging device in accordance with an exemplary embodiment. The medical imaging device includes a touch-sensitive display 102, a processor 104, and a medical image acquisition subsystem 106. The processor 104 is in electronic communication with both the touch-sensitive display 102 and the medical image acquisition subsystem 106.

According to the exemplary embodiment shown in FIG. 1, the medical image acquisition subsystem 106 includes ultrasound hardware for acquiring ultrasound data. However, according to other embodiments the medical image acquisition subsystem 106 may include hardware for acquiring diagnostic images for any other modality including X-ray, magnetic resonance, computed tomography, positron emission tomography, and single photon emission computed tomography. The examples described in this disclosure will be primarily focused on embodiments where the medical image acquisition subsystem comprises ultrasound hardware, but it should be appreciated that other embodiments may use hardware associated with any of the aforementioned imaging modalities.

The medical image acquisition subsystem 106 includes a transmitter 108 that transmits a signal to a transmit beamformer 110 which in turn drives transducer elements 114 to emit pulsed ultrasonic signals into a structure, such as a patient (not shown). A probe 112 includes the transducer elements 114 and may optionally include probe/SAP electronics. The probe/SAP electronics may be used to control the switching of the transducer elements 114. The probe/SAP electronics may also be used to group the transducer elements 114 into one or more sub-apertures. A variety of geometries of transducer arrays may be used. The pulsed ultrasonic signals are back-scattered from structures in the body, like blood cells or muscular tissue, to produce echoes that return to the transducer elements 114. The echoes are converted into electrical signals, or ultrasound data, by the transducer elements 114, and the electrical signals are received by a receiver 116. For purposes of this disclosure, the term ultrasound data may include data that was acquired and/or processed by an ultrasound system. Examples of ultrasound data include volumetric ultrasound data, two-dimensional ultrasound data, and one-dimensional ultrasound data. The electrical signals representing the received echoes pass through a receive beamformer 118 that outputs ultrasound data. The touch-sensitive display 102 in combination with the processor 104 may be used to provide a touch-based user interface. The touch-based user interface may be used to control the input of patient data, change a scanning or display parameter, collect quantitative measurements, and the like.

The processor 104 may be configured to process the ultrasound data and generate frames or images for display on the touch-sensitive display 102. The processor 104 is in electronic communication with the probe 112 and the touch-sensitive display 102. The processor 104 may be hard-wired to the probe 112 and the touch-sensitive display 102, or the probe 112 may be in electronic communication through other techniques including wireless communication. The processor 104 may be adapted to perform one or more processing operations according to a plurality of selectable ultrasound modalities on the ultrasound data. Other embodiments may use multiple processors to perform various processing tasks. The processor 104 may also be adapted to control the acquisition of ultrasound data with the probe 112. The ultrasound data may be processed in real-time during a scanning session as the echo signals are received. For purposes of this disclosure, the term "real-time" is defined to include a process performed with no intentional lag or delay. An embodiment may update the displayed ultrasound image at a rate of more than 20 times per second. The images may be displayed as part of a live image. For example, ultrasound data may be acquired even as images are being generated based on previously acquired data and while a live image is being displayed. Then, according to an embodiment, as additional ultrasound data are acquired, additional frames or images generated from more-recently acquired ultrasound data are sequentially displayed. Additionally or alternatively, the ultrasound data may be stored temporarily in a buffer (not shown) during a scanning session and processed in less than real-time in a live or off-line operation. Some embodiments of the invention may include multiple processors (not shown) to handle the processing tasks. For example, a first processor may be utilized to demodulate and decimate the ultrasound signal while a second processor may be used to further process the data prior to displaying an image. It should be appreciated that other embodiments may use a different arrangement of processors.

Still referring to FIG. 1, the medical image acquisition subsystem 106 may continuously acquire ultrasound data at a frame rate of, for example, 20 Hz to 150 Hz. However, other embodiments may acquire ultrasound data at a different rate. A memory (not shown) may be included for storing processed frames of acquired ultrasound data that are not scheduled to be displayed immediately.

Figure 2:
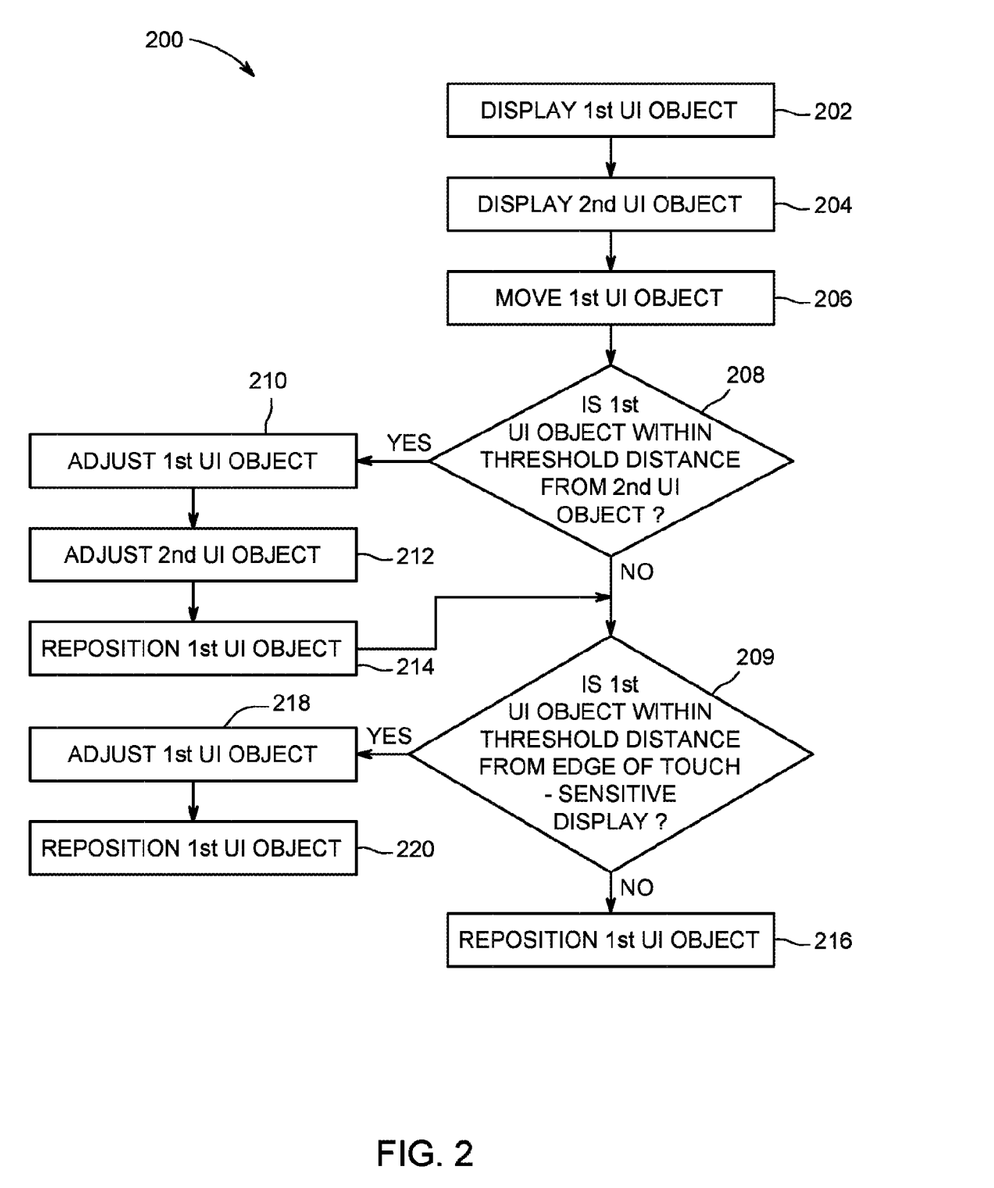
FIG. 2 is a flow chart is accordance with an exemplary embodiment.

FIG. 2 is a flow chart is accordance with an exemplary embodiment. The individual blocks represent steps that may be performed in accordance with the method 200. The technical effect of the method 200 is the adjusting a position of a first selection point with respect to a first boundary of a UI object in response to a touch-based user input when the first UI object is within a threshold distance of either a second UI object or an edge of a touch-sensitive display. The steps of the method 200 will be described according to an exemplary embodiment where the steps are performed with the medical imaging device 100 (shown in FIG. 1). The steps of the method 200 will be described hereinafter.

Figure 3:
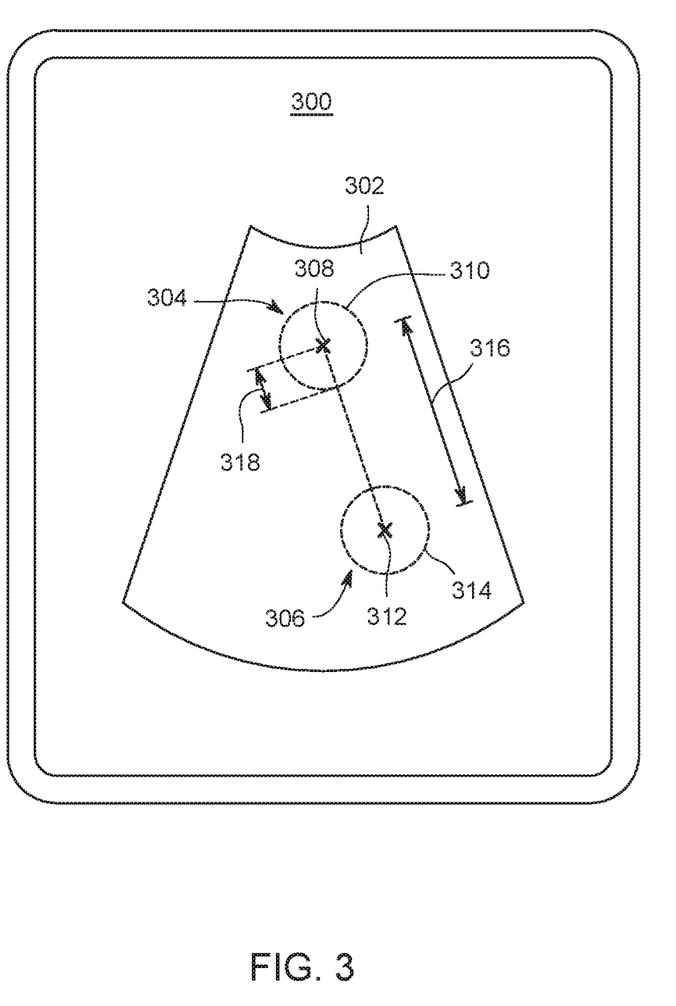
FIG. 3 is a schematic representation of a touch-sensitive display in accordance with an exemplary embodiment.

FIG. 3 is a schematic representation of a touch-sensitive display in accordance with an exemplary embodiment. FIG. 3 includes a touch-sensitive display 300, an image 302, a first UI object 304, and a second UI object 306. The first UI object 304 includes a first selection point 308 and a first boundary 310. The second UI object 306 includes a second selection point 312 and a second boundary 314. The first boundary 310 and the second boundary 314 are both represented by a dashed line in FIG. 3. The first boundary 312 and the second boundary 314 may be represented by a solid line in other embodiments. The first boundary 310 is a circle in FIG. 3, but according to other embodiments, the first boundary 310 and/or the second boundary 314 may be an elliptical boundary, a rectangular boundary, or a boundary shaped like any other polygon. According to other embodiments the boundary may be designated by a region of color instead of the dashed line shown in FIG. 3. For embodiments using color to designate the first or second boundary, the color will preferably be translucent to allow the user to see the details of the image inside the first or second boundary. The first selection point 308 is an "x" in FIG. 3, but in other embodiments, the first selection point 308 and/or the second selection point 312 may be a point, a dot, a star, a bull's-eye, or any other shape that may be used to designate a point in the image 300. Common reference numbers will be used to identify identical elements in various figures within this disclosure.

A user may use one or more touch-based user inputs to control the position of each UI object. In many embodiments, the user may position a finger or a stylus within the boundary of the UI object in order to adjust the position of the UI object. The UI object may move as a single entity, with a fixed relationship between the boundary and the selection point, at distances greater than a threshold distance from other UI objects and/or an edge of the touch-sensitive display. The user may, for instance, adjust the position of the UI object to position the selection point over a desired structure or location in the image when performing a user operation such as obtaining a measurement. However, when the UI object is positioned at a distance of less than the threshold distance from another UI object or an edge of the touch-sensitive display, the processor 104 may adjust the relative position of the selection point with respect to the boundary of the UI object. Additional details about the way that the selection point may be adjusted with respect to the boundary will be discussed hereinafter.

Referring to FIGS. 2 and 3, at step 202 the processor 104 displays a first UI object, such as the first UI object 304, on the touch-sensitive display 300. At step 204 the processor 104 displays a second UI object, such as the second UI object 306 on the touch-sensitive display. At step 206, a user manipulates the position of the first UI object 304 by interfacing with the touch-sensitive display 300. According to an embodiment, the user may use an object, such as a digit of a hand or a stylus, to control the position of the first UI object 304 and, in turn, the position of the first selection point 308. Details about the way the first selection point 308 moves with respect to the first boundary 310 will be described in detail hereinafter.

According to an embodiment the first selection point 308 may be positioned in the center of the first boundary 310 when the first UI object 304 is at a distance greater than a threshold distance away from the second UI object 306. For embodiments where the first boundary 310 is a circle, this means that the first selection point 308 is in the center of the circle. A center may be calculated for other shapes as well. The first selection point 308 may be fixed in position with respect to the first boundary 310 when the first UI object 304 is positioned at a distance greater than a threshold distance away from the second UI object 306. In other words, when the first UI object 304 is more than a threshold distance away from the second UI object 306, the first selection point 308 will stay in the center of the first boundary 310 as the user manipulates or moves the position of the first UI object 304, such as during step 206 of the method 200.

While step 206 specifies moving the first UI object 304, the user may position one or both of the first UI object 304 and/or the second UI object 306 on the touch-sensitive display 300 in order to perform a user operation. For example, the first UI object 304 may be a first measuring caliper and the second UI object 306 may be a second measuring caliper. The user may position the first measuring caliper (i.e., first UI object 304) and the second measuring caliper (i.e., second UI object 306) to determine a distance or measurement between two or more structures indicated by the placement of the first selection point 308 and the second selection point 312. One or more UI objects similar to either the first UI object 304 or the second UI object 306 may be used to perform other user operations according to other embodiments. For example, one or more UI objects may be used to trace a contour in the image 300, or one or more UI objects may be used to define a region-of-interest (ROI) or a volume-of-interest (VOI). One or more UI objects may be used for free-form drawing of a shape or tracing an object in the image 300. Additionally, one or more UI objects may be used perform an area or a volume measurement.

At step 208, the processor 104 determines if the first UI object 304 is within a threshold distance from the second UI object 306. The threshold distance may be user selectable, or the threshold distance may be a present distance. Exemplary embodiments may have a threshold distance of between 0.5 cm and 2 cm as it may be difficult for a typical user to accurately position the first selection point 308 and/or the second selection point 312 with the touch-sensitive display at distances smaller than 0.5-2 cm since the user's fingers may partially obscure the screen near the positions where the user desires to position the selection points.

At step 208, the processor 104 determines if the first UI object 304 is within the threshold distance from the second UI object 306. If the first UI object 304 is outside of the threshold distance from the second UI object 306, then the method advances to step 209. However, if the first UI object 304 is within the threshold distance from the second UI object 306, then the method 200 advances to step 210.

Figure 4:
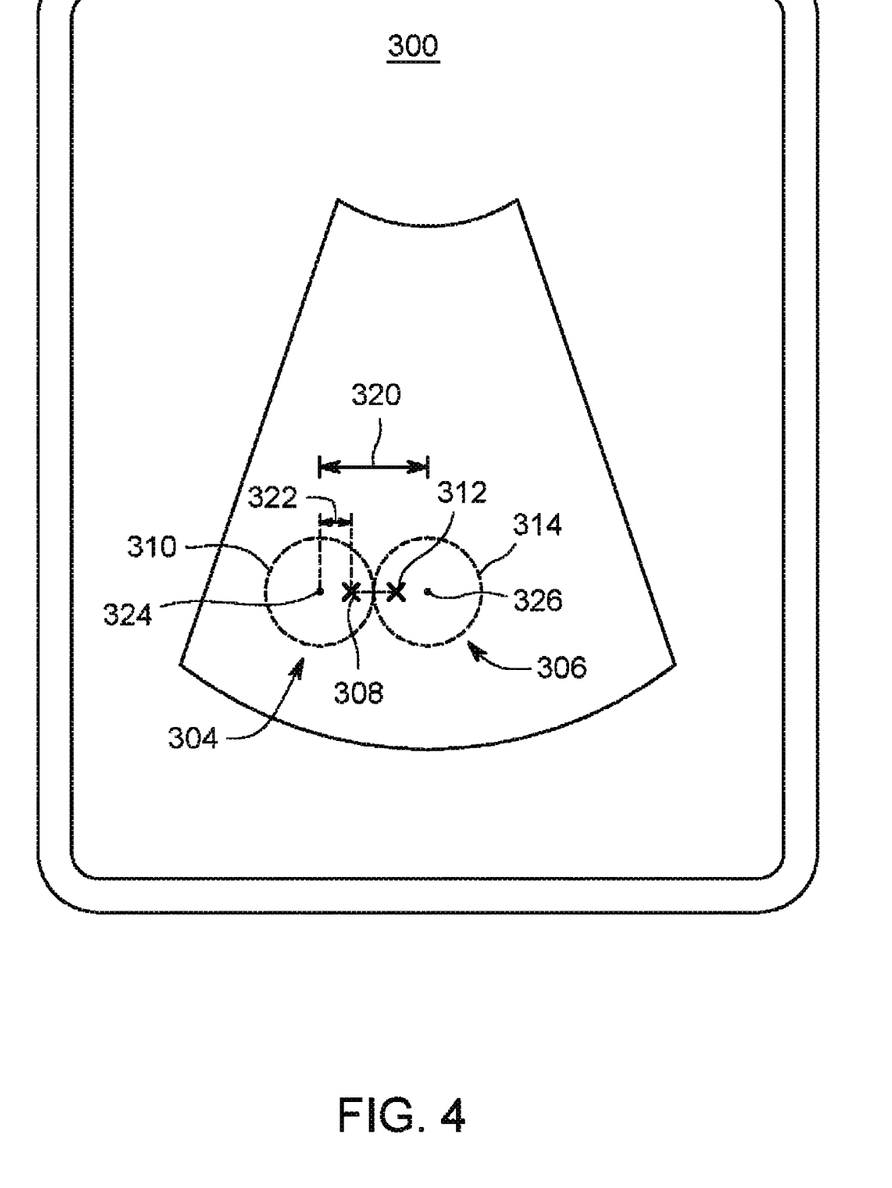
FIG. 4 is a schematic representation of a touch-sensitive display in accordance with an exemplary embodiment.

FIG. 4 is a schematic representation of a touch-sensitive display in accordance with an exemplary embodiment. Common reference numbers are used to identify identical components in FIGS. 3 and 4. Referring to FIG. 3, the first UI object 304 is positioned at a distance 316 from the second UI object as measured from the center of the first UI object 304 to the center of the second UI object 306. The first selection point 308 is positioned at a first distance 318 from the first boundary 310. The first distance 318 corresponds to the radius of the first boundary 310, which is a circle, according to an exemplary embodiment. As described above with respect to step 206, the first selection point 308 may stay positioned in the center of the first boundary 310 during the process of repositioning the first UI object 304 when the first UI object 304 is at a distance greater than the threshold distance away from the second UI object 306 according to an exemplary embodiment.

At step 210, the processor 104 adjusts the first UI object 304 after determining that the first UI object 304 is within the threshold distance from the second UI object 306. Adjusting the first UI object 304 may, for example, include adjusting the position of the first selection point 308 with respect to the first boundary 310. Referring to FIG. 4, after determining that the first UI object 304 is within the threshold distance from the second UI object 306, the processor 104 may adjust the position of the first selection point 308 with respect to the first boundary 310. According to an exemplary embodiment, the position of the first selection point 308 may be adjusted from a center 324 of the first UI object 304 towards a center 326 of the second UI object 306. According to an exemplary embodiment, the first selection point 308 may be adjusted to a position that is within 4 mm of an edge of the first boundary 310. In FIG. 4, the first UI object 304 is positioned away from the center 324 in a distance towards the second UI object 306 than in the FIG. 3. A second distance 320 represents a distance between the center 324 of the first UI object 304 and the center 326 of the second UI object 306. According to other embodiments, the distance between the first UI object 304 and the second UI object 306 may be measured or determined based on the shortest distance between the first boundary 310 and the second boundary 314.

Figure 5:
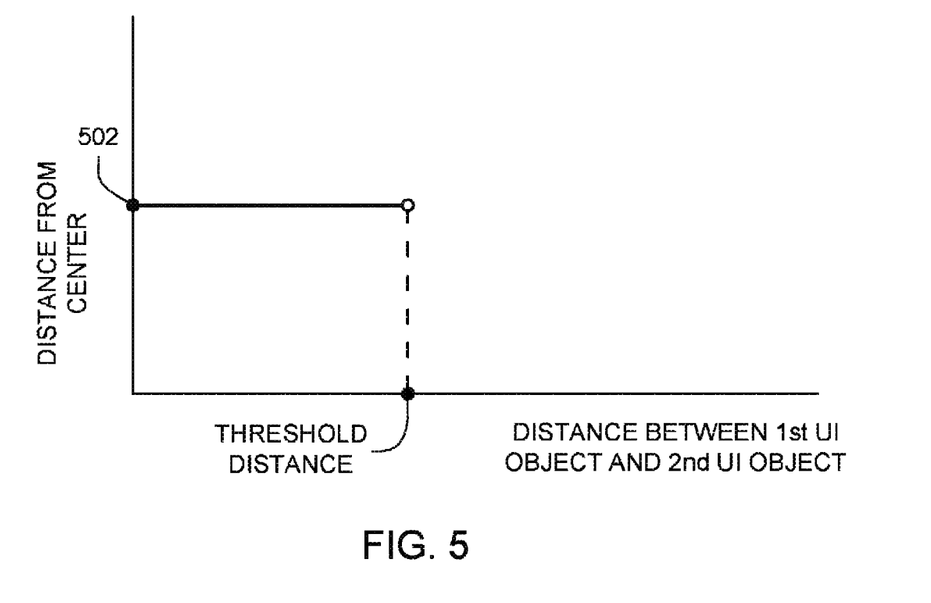
FIG. 5 is a graph showing distance of a selection point from a center of a boundary versus distance between a first UI object and a second UI object according to an exemplary embodiment.

FIG. 5 is a graph showing distance of a selection point from a center of a boundary versus distance between a first UI object and a second UI object according to an exemplary embodiment.

Figure 6:
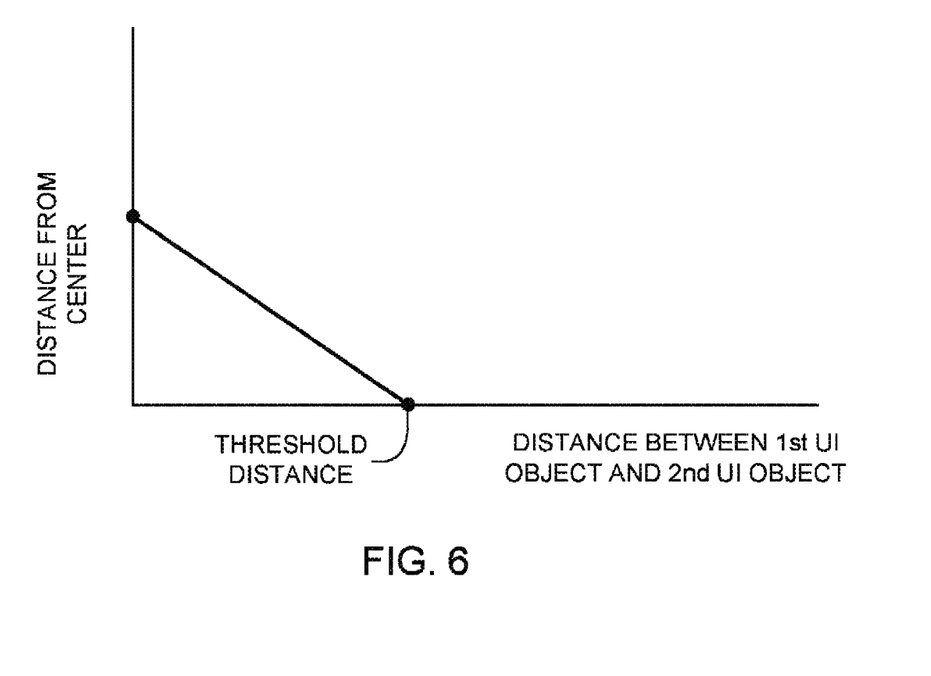
FIG. 6 is a graph showing distance of a selection point from a center of a boundary versus distance between a first UI object and a second UI object according to an exemplary embodiment.

FIG. 6 is a graph showing distance of a selection point from a center of a boundary versus distance between a first UI object and a second UI object according to an exemplary embodiment.

Figure 7:
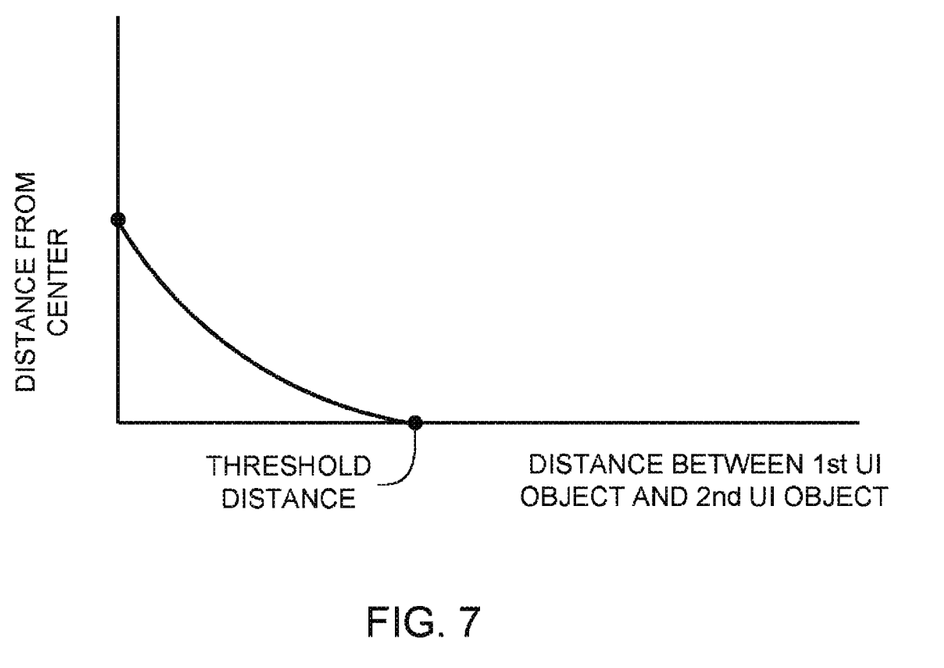
FIG. 7 is a graph showing distance of a selection point from a center of a boundary versus distance between a first UI object and a second UI object according to an exemplary embodiment.

FIG. 7 a graph showing distance of a selection point from a center of a boundary versus distance between a first UI object and a second UI object according to an exemplary embodiment.

FIGS. 5, 6, and 7 show three exemplary ways that the processor 104 may adjust the position of a selection point, such as the first selection point 308 or the second selection point 312, with respect to a boundary, such as the first boundary 310 or the second boundary 314 respectively. FIGS. 5, 6, and 7 will be described with respect to the first UI object 304, but it should be appreciated that they could apply equally well to another UI object such as the second UI object 306.

FIG. 5 represents an embodiment where the processor 104 adjusts the first selection point 308 between two binary positions. When the distance between the first UI object 304 and the second UI object 306 is greater than the threshold distance, the first selection point 308 is positioned at the center of the first boundary 310. When the distance between the first UI object 304 and the second UI object 306 is less than or equal to the threshold distance, the first selection point 308 is positioned at a second position that is displaced at a distance indicated by point 502 from the center of the first boundary 310. Note that the position of the first selection point 308 transitions from a first position at the center of the first boundary 310 to a second position displaced at the distance indicated by point 502 without being positioned at any intermediate positions between the first position and the second position. According to an exemplary embodiment, the second position may be in a direction towards the second UI object 306.

FIG. 6 is a graph of an embodiment where the processor 104 adjusts the position of the first selection point with respect to the first boundary 310 according to a linear function based on distance between the first UI object 304 and the second UI object 306. Embodiments where the processor 104 controls the position of the first selection point 308 with respect to the first boundary 310 according to the graph shown in FIG. 6 have a variable rate of change for the position of the selection point as the first UI object 304 is brought towards the second UI object 306 at a constant rate. In other words, assuming the as the first UI object 304 is being brought towards the second UI object 306 at a constant rate, the first selection point 308 is moved a relatively small amount for distances close to the threshold, but as the two UI objects are brought closer together, the rate at which the first selection point 308 moves away from the center 324 of the first boundary 310 increases. According to an exemplary embodiment the first selection point 308 may be moved away from the center of the boundary 310 in a direction towards the second UI object 306 at distances less than the threshold distance.

FIG. 7 is a graph of an embodiment where the processor 104 adjusts the position of the first selection point 308 with respect to the first boundary 310 according to a non-linear function based on distance between the first UI object 304 and the second UI object 306. According to the embodiment shown in FIG. 7, the non-linear function is a curve. The curve shown in FIG. 7 results in relatively small changes in the position of the first selection point 308 when the first UI object 304 and the second UI 306 object are separated by a distance that is less than, but relatively close to the threshold distance. However, the curve means that the rate at which the first selection point 308 moves away from the center of the first boundary changes so that the first selection point 308 moves a relatively greater amount per unit of displacement at distances between the first UI object 304 and the second UI object that are significantly shorter than the threshold distance. According to an exemplary embodiment the first selection point 308 may be moved away from the center of the boundary 310 in a direction towards the second UI object 306 at distances less than the threshold distance.

Controlling the position of the first selection point according to the graph shown in FIG. 5 results in the first selection point "jumping" between a first discrete position and a second discrete position without any intermediate positions. Controlling the position of the first selection point according to the graphs shown in FIG. 6 or 7 allows for the first selection point 308 to be positioned in multiple intermediate positions based on the distance between the first UI object 304 and the second UI object 306. As such, some users may find controlling the position of the first selection point according to the graphs shown in either FIG. 6 or FIG. 7 to be more intuitive since the first selection point moves continuously as the first UI object 304 is brought closer to the second UI object. FIGS. 5, 6, and 7 are just three exemplary embodiments showing ways that the position of the first selection point may be controlled. It should be appreciated that the position of the first selection point may be adjusted according to another function, including a step function with more than two "steps" according to other exemplary embodiments. According to some embodiments, the user may select the function used to control the movement of the first selection point for distances less than or equal to the threshold distance. According to yet other embodiments, the user may be able to define or adjust the function used to control the movement of the selection point for distances less than or equal to the threshold distance.

Referring back to FIG. 2, at step 212, the processor 104 adjusts the second UI object 306. For example, for instances when the first UI object 304 is within the threshold distance from the second UI object 306, the processor 104 may adjust both the first UI object 304 and the second UI object 306. The processor 104 may adjust the position of the second selection point 312 with respect to the second boundary 314 according to any of the same techniques that were described hereinabove with respect to the first UI object 304. According to an exemplary embodiment, the processor 104 may adjust the second selection point 312 in a direction towards the first UI object 304. In other words, when the first UI object 304 and the second UI object 306 are within the threshold distance of each other, the processor 104 may adjust the relative position of the first selection point 308 and the second selection point 312 towards each other. According to some embodiments, the first selection point 308 may be positioned on the first boundary 310 and the second selection point 312 may be positioned on the second boundary 314. According to yet other embodiments, the processor 104 may adjust the first UI object 304 so the first selection point is moved outside of the first boundary 310 in a direction towards the second UI object 306. Likewise, the processor 104 may adjust the second UI object 306 so the second selection point 312 moved outside the second boundary 314 in a direction towards the first UI object 304.

Adjusting the first UI object at step 210 and the second UI object at step 212 allows the operator to see the selection point more easily in situations where the first UI object 304 and the second UI object 306 are within the threshold distance of each other. By adjusting the relative position of the first selection point 304 and the second selection point 306 respectively, the user is less likely to obscure the selection points when positioning the first UI object 304 relatively close to the second UI object 306 (i.e., when the first UI object 304 is within the threshold distance from the second UI object 306). Adjusting the first UI object 304 and the second UI object 306 as described with respect to step 210 and 212 allows the user to perform more accurate fine adjustments in order to position the first and second selection points in the desired locations. This allows the user to perform user operations, such as measurements, more accurately.

At step 214, the processor 104 repositions the first UI object 304 after adjusting the first UI object 304 at step 210. It should be appreciated that not all embodiments may include the step 214 of repositioning the first UI object 304. For example, depending upon the size of the user input (i.e., the magnitude of the touch-based user input), simply adjusting the first UI object 304 at step 210 and the second UI object 306 at step 212 may result in the desired positioning of the first selection point 308 and the second selection point 312 without moving the first boundary 310 or the second boundary 314.

After completing step 214, the method 200 advances to step 209. Or, at step 208, if the first UI object is not within the threshold distance from the second UI object 306, then the method 200 advances to step 209. At step 209, the processor 104 determines if the first UI object 304 is within a threshold distance from an edge of the touch-sensitive display 300. The threshold distance used at step 209 may be the same threshold distance used during step 208, or the processor 104 may use a different threshold distance. The threshold distance may be user configurable. According to an exemplary embodiment, the threshold distance may be selected to be between 0.25 cm and 0.75 cm, which are 50% of the exemplary values provided for step 208 since there is only one UI object interfacing with the edge of the touch-sensitive display 300 at step 209. However, it should be appreciated that other embodiments may select the threshold distance used during step 209 from a range other than between 0.25 cm and 0.75 cm.

If the first UI object 304 is outside of the threshold distance, the method 200 advances to step 216, and the processor 104 repositions the first UI object 304. If the first UI object 304 is within the threshold distance from the edge of the touch-sensitive display, then the method 200 advances to step 218.

Figure 8:
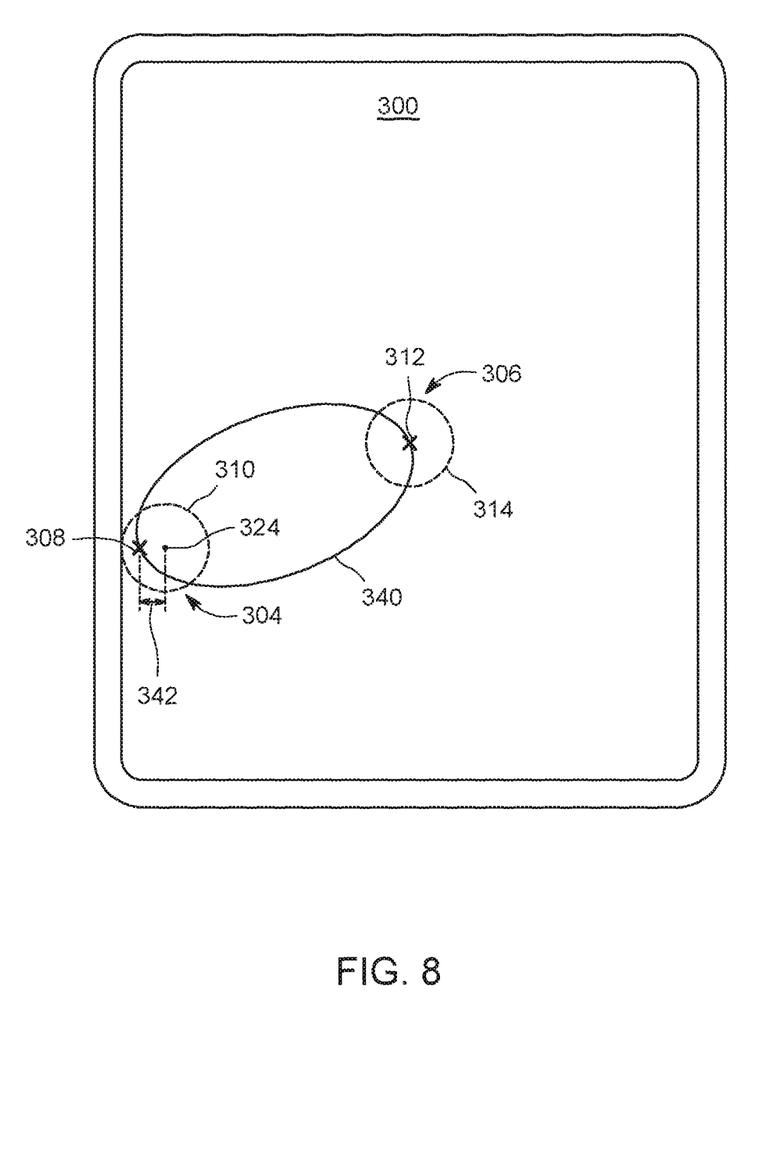
FIG. 8 is a schematic representation of a touch-sensitive display in accordance with an exemplary embodiment.

FIG. 8 is a schematic representation of a touch-sensitive display 300 in accordance with an exemplary embodiment. Common reference numbers are used to identify identical elements in FIG. 8.

Referring to FIGS. 2 and 8, at step 218, the processor 104 adjusts the first UI object 304 after determining that the first UI object 304 is within the threshold distance from the edge of the touch-sensitive display 300. FIG. 8 shows an embodiment where the first UI object 304 and the second UI object 306 are used to set an ROI or an elliptical area used for a measurement. The user may, for instance, control the size of an ellipse 340 based on the relative positioning of the first UI object 304 and the second UI object 306. The processor 104 may, for example, adjust the position of the first selection point 308 at step 218. According to an embodiment shown in FIG. 8, the processor 104 may adjust the position of the first selection point 308 by moving the first selection point 308 towards the nearest edge of the touch-sensitive display 300. In FIG. 8, the first UI object 304 is near the edge of the touch-sensitive display 300. The processor 104 has, however, adjusted the position of the first selection point 308 so that the first selection point 308 has moved with respect to the first border 310 to a position that is closer to the edge of the touch-sensitive display 300. A distance 342 indicates the amount that the processor 104 adjusted the position of the first selection point 308 from the center 324 within the first border 310. The embodiment shown in FIG. 8 allows the user to position the first selection point 308 all the way at the edge of the touch-sensitive display 300 and for the entire first boundary 310 to remain visible on the touch-sensitive display 300.

Figure 9:
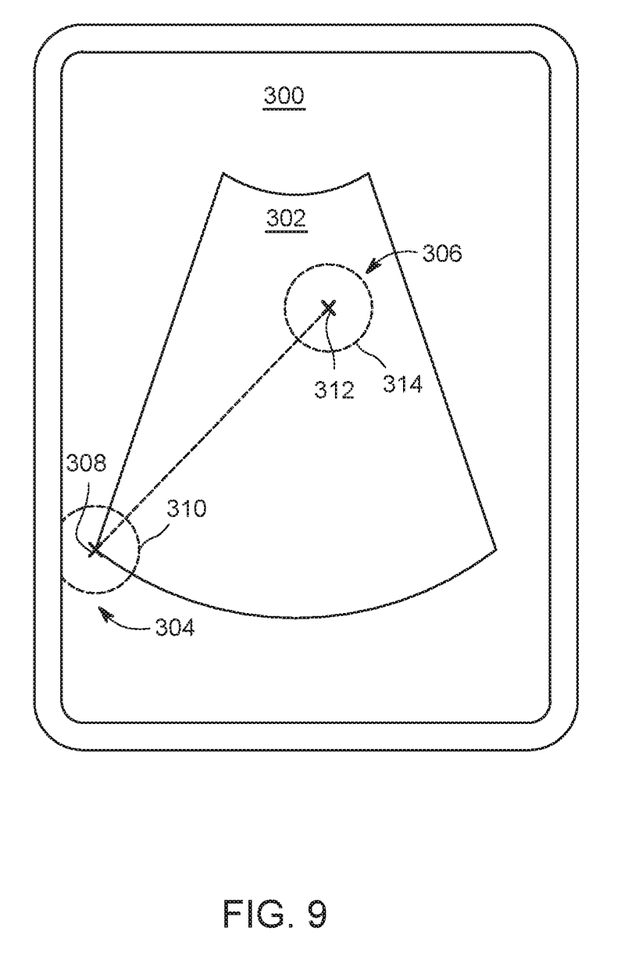
FIG. 9 is a schematic representation of a touch-sensitive display in accordance with an exemplary embodiment.

FIG. 9 is a schematic representation of a touch-sensitive display 300 in accordance with an exemplary embodiment. According to the embodiment shown in FIG. 9, the processor 104 may adjust the position of the first UI object 304 so that the first UI object 304 is partially off the touch-sensitive display 300. This enables the first selection point 308 to be positioned all the way at the edge of the touch-sensitive display 300.

At step 220, the processor 104 repositions the first UI object 304 after adjusting the first UI object 304. As described with respect to steps 210, 212, and 214, the processor 104 may reposition the first UI object 304 in response the user's instruction to move the first UI object 304 at step 206 after adjusting the position of the first selection point 308 with respect to the first boundary 310. It should be appreciated that some embodiments may not include the step 220 of repositioning the first UI object 304. For example, the processor 104 may adjust the position of the first selection point 308 with respect to the first boundary 310 (as described in step 218) in response to a user input without repositioning the first UI object 304. According to other embodiments the processor 104 may optionally reposition the first UI object 304, as described in step 220, depending upon the amount of distance the user is attempting to move the first selection point 308 through the control input and/or the position of the first UI object 304 with respect to the edge of the touch-sensitive display 300.

While the method 200 was described primarily with respect to the first UI object 304, it is envisioned that embodiments may control the position of the second selection point 312 with respect to the second boundary 314 in a manner similar to that which was described with respect to the first UI object 304. Additionally, according to other embodiments, the processor may adjust more than two UI objects in a manner similar to that which was described with respect to the first UI object 304.

Figure 10:
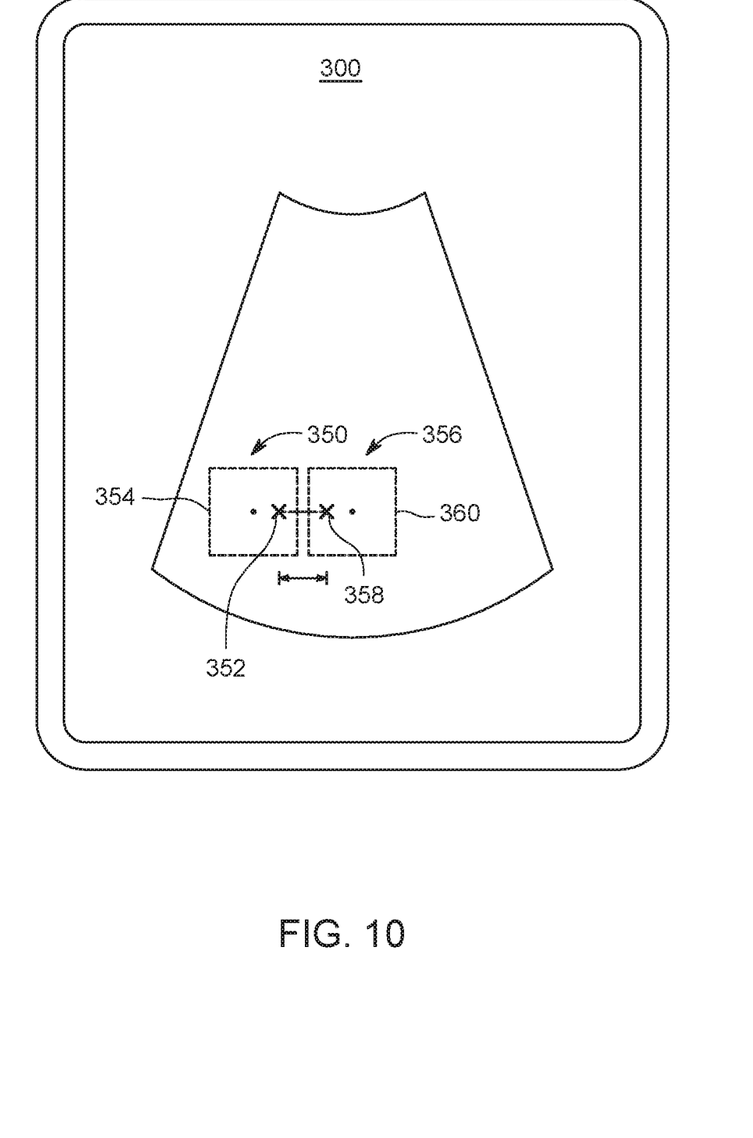
FIG. 10 is a schematic representation of a touch-sensitive display in accordance with an exemplary embodiment.

FIG. 10 is a schematic representation of a touch-sensitive display 300 in accordance with an exemplary embodiment. FIG. 10 includes a first UI object 350, which includes a first selection point 352 and a first boundary 354. FIG. 10 also includes a second UI object 356, which includes a second selection point 358 and a second boundary 360. The first boundary 354 and the second boundary 360 are both rectangular in shape according to an exemplary embodiment. The first and second UI objects otherwise function similarly to the first UI object 304 and the second UI object 306 described with respect to FIG. 3.

Figure 11:
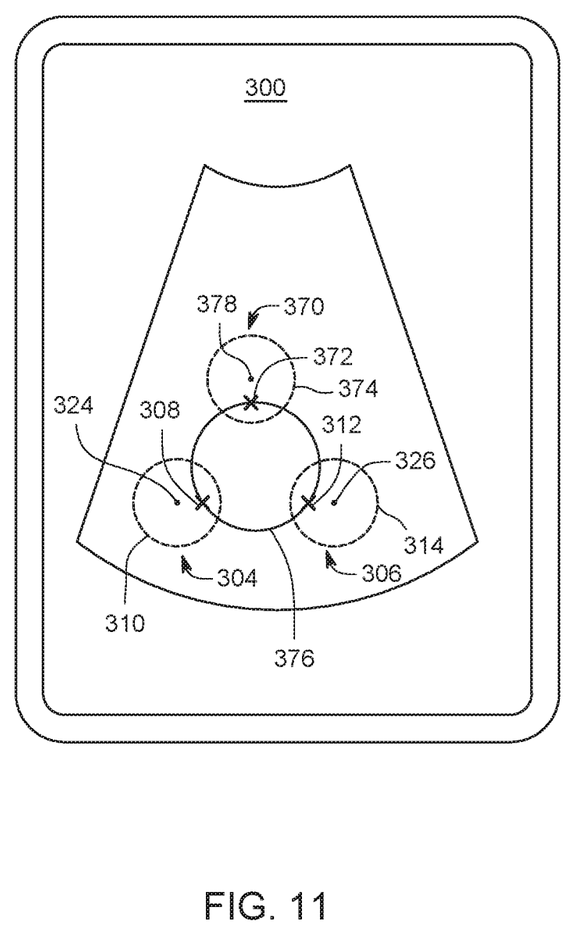
FIG. 11 is a schematic representation of a touch-sensitive display in accordance with an embodiment.

FIG. 11 is a schematic representation of a touch-sensitive display 300 in accordance with an embodiment. FIG. 11 includes the first UI object 304 and the second UI object 306 that were previously described with respect to FIG. 3. FIG. 11 also includes a third UI object 370. The third UI object 370 includes a third selection point 372 and a third boundary 374. According to an embodiment, the user may position the first UI object 304, the second UI object 306, and the third UI object 370 to define the size and shape of an ellipse 376. According to an embodiment, the processor 104 may adjust the positions of the first selection point 308 with respect to the first boundary 310 when the first UI object is within a threshold distance of two or more UI objects, such as the second UI object 306 and the third UI object 370. The processor 104 may, for instance, adjust the first selection point 308 towards location in the middle of the two or more UI objects. This allows the user to control the locations of the selection points more easily and more accurately as the UI objects are brought closer to each other. According to an embodiment, the processor 104 may adjust the positions of the second selection point 312 with respect to the second boundary 314 and the third selection point 372 with respect to the third boundary 374 in a manner similar to that which was described for the first UI object 304.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A medical imaging device comprising:
   a touch-sensitive display configured to receive touch-based user inputs and display an image;
   a medical image acquisition subsystem; and
   a processor in electronic communication with the touch-sensitive display and the medical image acquisition subsystem, wherein the processor is configured to:
      display a first UI object on the touch-sensitive display, where the first UI object includes a first selection point and a first boundary, where the first selection point is adapted to be used to designate a first point in an image;
      display a second UI object on the touch-sensitive display, where the second UI object includes a second selection point and a second boundary, where the second selection point is adapted to be used to designate a second point in the image;
      adjust a position of the first UI object in response to a touch-based user input received while a finger or a stylus is positioned within the first boundary, where the processor is configured to adjust the position of the first UI object as a single entity such that there is a fixed relationship between the first selection point and the first boundary when the first UI object is positioned at distances greater than a threshold distance from both the second UI object and an edge of the touch-sensitive display, and where the processor is configured to adjust the position of the first selection point with respect to the first boundary when the first UI object is positioned within the threshold distance from one of the second UI object and the edge of the touch-sensitive display;
      receive an instruction for a user operation based at least in part on the touch-based user input; and
      implement the user operation.

2. The medical imaging device of claim 1, wherein the processor is configured to automatically adjust the position of the first selection point in a direction towards the edge with respect to the first boundary of the UI object when the first UI object is within the threshold distance from the edge of the touch-sensitive display.

3. The medical imaging device of claim 1, wherein the processor is configured to automatically adjust the position of the first selection point in a direction towards the second UI object when the first UI object is within the threshold distance from the second UI object.

4. The medical imaging device of claim 3, wherein the first UI object comprises a first measuring caliper and the second UI object comprises a second measuring caliper, and wherein the user operation comprises obtaining a measurement from a first point indicated by the first selection point and a second point indicated by the second selection point.

5. The medical imaging device of claim 4, wherein the first boundary comprises a circle.

6. The medical imaging device of claim 5, wherein the first boundary comprises a rectangle.

7. The medical imaging device of claim 1, wherein the threshold distance comprises a distance from within the range of 0.5 cm to 2 cm.

8. The medical imaging device of claim 1, wherein the threshold distance is user configurable.

9. The medical imaging device of claim 1, wherein the processor is configured to automatically adjust the position of the first selection point to a position outside of the first boundary in response to the touch-based user input.

10. The medical imaging device of claim 1, wherein the processor is configured to allow the first boundary to be positioned partially off the touch-sensitive display in response to the touch-based user input.

11. A method of performing a user operation on a medical imaging device including a touch-sensitive display and a processor, the method comprising:
    displaying a first UI object including a first boundary and a first selection point on the touch-sensitive display;
    displaying a second UI object including a second boundary and a second selection point on the touch-sensitive display at the same time as the first UI object;
    receiving a first touch-based user input while a finger or a stylus is positioned within the first boundary;
    determining that the first UI object is positioned at a distance greater than a threshold distance from the second UI object and an edge of the touch-sensitive display while receiving the first touch-based user input;
    adjusting a position of the first UI object in response to the first touch-based user input by adjusting the position of the first UI object as a single entity such that there is a fixed relationship between the first selection point and the first boundary while adjusting the position of the first UI object;
    receiving a second touch-based user input while the finger or the stylus is positioned within the first boundary;
    determining that the first UI object is positioned at a distance less than the threshold distance from at least one of the second UI object and the edge of the touch-sensitive display while receiving the second touch-based user input;
    adjusting a position of the first selection point with respect to the first boundary in response to receiving the second touch-based user input;
    providing instructions to the processor for a user operation based at least in part on one of the first touch-based user input and the second touch-based user input; and
    implementing the user operation with the processor.

12. The method of claim 11, wherein the first UI object is within the threshold distance from the edge of the touch-sensitive display while receiving the second touch-based user input, and wherein adjusting the position of the first selection point with respect to the first boundary comprises adjusting the first selection point in a direction towards the edge with respect to the first boundary.

13. The method of claim 11, wherein the first UI object is within the threshold distance from the second UI object while receiving the second touch-based user input, and wherein adjusting the position of the first selection point with respect to the first boundary comprises adjusting the first selection point in a direction towards the second UI object.

14. The method of claim 13, further comprising adjusting a position of the second selection point with respect to the second boundary in response to adjusting the position of the first UI object within the threshold distance from the second UI object.

15. The method of claim 13, wherein the first UI object is a first measurement caliper and the second UI object is a second measurement caliper and the second touch-based user input is an action to perform a measurement.

16. The method of claim 11, wherein adjusting the position of the first selection point with respect to the first boundary comprises adjusting the first selection point from a first position in the center of the first boundary to a second position that is within 4 mm of the edge of the first boundary.

17. The method of claim 16, wherein adjusting the position of the first selection point with respect to the first boundary comprises automatically adjusting the position of the first selection point based on a function based on the distance between the first UI object and one of the second UI object and the edge of the touch-based display, and wherein the function includes at least one intermediate position between the first position and the second position.

18. The method of claim 17, wherein adjusting the position of the first selection point with respect to the first boundary comprises automatically adjusting the position of the first selection point according to a linear function based on the distance between the first UI object and one of the second UI object and the edge of the touch-based display.

19. The method of claim 17, wherein adjusting the position of the first selection point with respect to the first boundary comprises automatically adjusting the position of the first selection point according to a non-linear function based on the distance between the first UI object and one of the second UI object and the edge of the touch-based display, where the non-linear function results in a higher rate-of-change for the first selection point as the distance between the first UI object and one of the second UI object and the edge of the touch-based display decreases.

20. The method of claim 11, wherein adjusting the position of the first selection point with respect to the first boundary comprises automatically adjusting the position of the first selection point from a center within the first boundary to a position outside of the first boundary.

* * * * *